(12) United States Patent
Gaborieau

(10) Patent No.: US 10,292,231 B2
(45) Date of Patent: May 14, 2019

(54) LIGHT DEVICE IN AT LEAST TWO PARTS FOR A MOTOR VEHICLE

(71) Applicant: VALEO VISION, Bobigny (FR)

(72) Inventor: Mathieu Gaborieau, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/476,201

(22) Filed: Mar. 31, 2017

(65) Prior Publication Data

US 2017/0290122 A1    Oct. 5, 2017

(30) Foreign Application Priority Data

Mar. 31, 2016   (FR) ...................................... 16 52827

(51) Int. Cl.
*B60Q 1/26* (2006.01)
*B60Q 1/30* (2006.01)
*B60Q 1/44* (2006.01)
*F21S 43/19* (2018.01)
*H05B 33/08* (2006.01)
*F21Y 115/10* (2016.01)

(52) U.S. Cl.
CPC ....... *H05B 33/0854* (2013.01); *B60Q 1/2607* (2013.01); *B60Q 1/30* (2013.01); *B60Q 1/44* (2013.01); *F21S 43/19* (2018.01); *B60Q 1/2619* (2013.01); *F21Y 2115/10* (2016.08)

(58) Field of Classification Search
CPC ... B60Q 1/26; B60Q 1/38; B60Q 1/34; B60Q 1/32; B60Q 1/323; B60Q 1/343; B60Q 1/2665; B60Q 3/14; B60Q 3/18; B60Q 2300/14; B60Q 2300/142–2300/144; B60Q 2300/12; B60Q 2300/122; B60Q 1/30; B60Q 1/0035; B60Q 1/0041; B60Q 1/0088; B60Q 1/2669; B60Q 1/2607; B60Q 2900/10; H05B 33/0848; B60R 1/1207; B62D 33/0273
See application file for complete search history.

(56) References Cited

U.S. PATENT DOCUMENTS

| 2,218,442 | A | 10/1940 | Thurber |
| 5,580,153 | A | 12/1996 | Motz |
| 2010/0244697 | A1* | 9/2010 | Illium .................. B60J 5/101 315/77 |

(Continued)

FOREIGN PATENT DOCUMENTS

| DE | 10 2013 218 152 A1 | 3/2015 | |
| DE | 102013218152 A1 * | 3/2015 | ............... B60Q 1/30 |

(Continued)

OTHER PUBLICATIONS

Translation of Sebe (WO 2017/098109).*

(Continued)

*Primary Examiner* — Alexander H Taningco
*Assistant Examiner* — Renan Luque
(74) *Attorney, Agent, or Firm* — Oblon, McClelland, Maier & Neustadt, L.L.P.

(57) ABSTRACT

The invention proposes a device and a method which make it possible to manage the light fluxes emitted respectively by fixed and mobile parts of a light device for a motor vehicle. It is noteworthy that the management of the light fluxes takes into account the relative position between the different parts of the light device.

21 Claims, 1 Drawing Sheet

(56) References Cited

U.S. PATENT DOCUMENTS

| | | | | |
|---|---|---|---|---|
| 2014/0333428 A1* | 11/2014 | Markell | ................... | B60Q 1/26 |
| | | | | 340/475 |
| 2015/0197194 A1* | 7/2015 | Salter | ................... | B60Q 1/2669 |
| | | | | 362/510 |
| 2015/0345731 A1* | 12/2015 | Noritake | .............. | B60Q 1/0041 |
| | | | | 362/516 |
| 2016/0332561 A1* | 11/2016 | Tseng | ........................ | B60Q 1/30 |
| 2016/0332563 A1* | 11/2016 | Tseng | ................... | B60Q 1/0041 |
| 2017/0259733 A1* | 9/2017 | Son | ........................ | B60Q 1/50 |

FOREIGN PATENT DOCUMENTS

| | | | |
|---|---|---|---|
| FR | 2 765 166 A1 | 12/1998 | |
| WO | WO 2017098109 A1 * | 6/2017 | ............... B60Q 1/30 |

OTHER PUBLICATIONS

Translation of Sauer (DE 102013218152).*
French Preliminary Search Report dated Nov. 16, 2016 in French Application 16 52827 filed on Mar. 31, 2016 (with English Translation of Categories of Cited Documents).

* cited by examiner

LIGHT DEVICE IN AT LEAST TWO PARTS FOR A MOTOR VEHICLE

The invention deals with the field of lighting and light signaling for motor vehicles. In particular, the invention relates to the lights producing a light function using two distinct parts, of which one can be mobile relative to the other, such as, for example, a rear stop light of which a first part is mounted on a rear wing of the vehicle, while a second part is mounted in the trunk lid.

In the field of lighting and light signaling for motor vehicles, it is becoming increasingly commonplace to use light sources of light-emitting diode, LED, type. An LED is a semiconductor component which, when it is passed through by an electrical current of a predetermined intensity, emits light rays. A light flux of a predetermined intensity, generally related to the intensity of the electrical current passing through the LED, can then be measured. The LED technology makes it possible on the one hand to reduce the electrical energy requirements of the lighting and/or signaling devices, and, on the other hand, it allows the vehicle constructors to create interesting and individual optical signatures. A plurality of LEDs can for example be arranged along a curvilinear outline.

It is known practice to provide the rear faces of a vehicle with rear lights which are arranged on fixed parts of the bodywork. These are, for example, rear side wings of the vehicle. Alternatively, the rear lights can be separated into two or more parts, at least one part being arranged on a fixed part, while at least one other part of the same light is arranged on the trunk lid of the vehicle. This part of the light is therefore mobile relative to the fixed part, and the two parts of the same light can assume different relative positions dependent on the position of the trunk lid. This solution is increasingly commonplace, since may users demand wide trunk openings. As this generates the need to provide increasingly wider trunk lids, the space available for mounting fixed rear lights is becoming increasingly restricted. Hence there has emerged the need to have a part of the lights on a face of the trunk lid. The rear lights can produce different light functions of the vehicle such as, for example, a stop light, a direction indicator, or similar.

As is known, the powering of the two parts (fixed and mobile) of a same light is done in common for the two parts. That is to say, each of the parts of the light emits, at any moment, a light flux of an identical intensity. This does not correspond to an efficient use, notably when the trunk lid, which bears a part of the rear light, is open and when the light in question is on.

The aim of the invention is to mitigate at least one of the problems posed by the prior art. The aim of the invention is in particular to propose a device and a method for managing the light flux which mitigate at least one of the problems posed by the prior art.

The subject of the invention is a light device for a motor vehicle. The device comprises at least two light sources, of which at least one first source is intended to be arranged on a first part of the chassis of the motor vehicle, and at least one second source is intended to be arranged on a second part of the chassis, such that the first and the second sources are capable of assuming at least two distinct and predetermined relative positions (P, P') relative to one another. The device is noteworthy in that it comprises means for controlling the light flux from the light sources, configured to control the emission of different light fluxes by the light sources, according to the relative position of the first and of the second sources, and in that the control means are configured to control the two light sources such that, according to the relative position of the first and second sources such that, for at least one first predetermined relative position, the first light source participates in the production of a first predetermined regulatory light function of the motor vehicle and the second light source participates in the production of a second predetermined regulatory light function of the motor vehicle distinct from the first predetermined regulatory light function and such that, for at least one second predetermined relative position, the first light source participates in the production of the second predetermined regulatory light function.

Preferably, the device can comprise means capable of obtaining a signal indicative of the relative position of the first and second sources.

The means for controlling the light flux can preferably be configured to control the first and second light sources such that these sources, when they are in a first relative position, together emit a first overall light flux capable of producing a first predetermined regulatory light function.

Preferably, the means for controlling the light flux can be configured to control the first source such that the first source emits a light flux of a first intensity when the indicated relative position corresponds to the first predetermined position (P), and a flux of a second intensity when the indicated relative position corresponds to the second predetermined position (P'), the first intensity being lower than the second intensity.

Preferably, the means for controlling the light flux can be configured to control the second source such that the second source emits a light flux of a first intensity when the indicated relative position corresponds to the first predetermined position (P), and a flux of a second intensity when the indicated relative position corresponds to the second predetermined position (P'), the first intensity being higher than the second intensity.

Preferably, the means for controlling the light flux can be configured to control the second source such that the second source emits a light flux of a first intensity when the indicated relative position corresponds to the first predetermined position (P), and a flux of a second intensity when the indicated relative position corresponds to the second predetermined position (P'), the first intensity being lower than the second intensity.

The means for controlling the light flux can preferably be configured to control the first and second light sources such that the sum of the first intensities of the light flux emitted by these sources is lower than or equal to a higher predetermined regulatory light intensity.

The means for controlling the light flux can preferably be configured to control the first and second light sources such that the sum of the second intensities of the light flux emitted by these sources is higher than or equal to a lower predetermined regulatory light intensity.

Preferably, the means for controlling the light flux can be configured such that the lower light intensity of the first and of the second sources is a minimum intensity, for example zero, and that the higher intensity of the first and second sources is a maximum intensity.

The means for controlling the light flux can preferably be configured such that the first and/or the second source emits a flux of an intensity lying between the lower intensity and the higher intensity, when the indicated position is an intermediate position between the first position (P) and the second predetermined position (P').

Preferably, one of the first source and/or the second source can be mobile between the first and the second predetermined positions, the other being fixed, and the means for controlling the light flux are configured such that the mobile source emits a flux of an intensity which is a function of an intermediate position between the first position (P) and the second predetermined position (P').

The means for controlling the light flux can preferentially be configured so as to power the light sources using an electrical current of intensity which is a function of the intensity of the light flux to be emitted by the sources. Preferably, the first and/or the second light source can comprise several elementary light sources.

The light sources can advantageously comprise at least one light-emitting semiconductor chip, for example a light-emitting diode LED, or an organic light-emitting diode, OLED.

Preferably, the obtaining means can comprise receiving means capable of receiving a signal originating from a communication network internal to the motor vehicle.

Preferably, the device can comprise a plurality of physically separate faces by which the light emitted by the first and/or the second light source is emitted.

Preferably, the means for obtaining a signal indicative of the relative position of the first and second sources comprise means for detecting the relative position of the first and second sources.

The obtaining means can preferentially comprise an inclinometer or an accelerometer.

The obtaining means and/or the control means can preferably comprise a microcontroller element.

Another subject of the invention is a motor vehicle equipped with a light device, noteworthy in that the light device corresponds to the invention.

The first light source can preferably be arranged on a rear wing of the chassis, and the second light source can preferentially be arranged on a face of the trunk lid of the vehicle, which is mobile relative to the rear wing of the chassis.

Preferably, the first predetermined position can correspond to the closed position of the trunk lid, and the second predetermined position can correspond to the open position of the trunk lid.

Another subject of the invention is a method for managing the light flux in a light device for a motor vehicle. The method is noteworthy in that it comprises the following steps:
  providing a light device comprising at least two light sources, of which at least one first source is intended to be arranged on a first part of the chassis of the motor vehicle, and at least one second source is intended to be arranged on a second part of the chassis, such that the first and second sources are capable of assuming at least two distinct and predetermined relative positions relative to one another;
  obtaining a signal indicative of the relative position of the first and second sources using means capable of obtaining such a signal;
  controlling the two light sources such that the two light sources participate in the production of a same predetermined regulatory light function of the motor vehicle, or participate in the production of two different predetermined regulatory light functions of the vehicle, according to the relative position of the first and the second sources, the position being indicated by said signal,
  powering at least one of the light sources so as to emit different light fluxes according to the relative position of the first and second sources, the position being indicated by said signal.

By using the measures of the invention, it becomes possible to satisfy the regulatory provisions in force concerning the intensity of the light flux emitted by light devices arranged on two parts of a motor vehicle, one being mobile relative to the other. Such a case occurs for example for a rear stop light, arranged partly on the rear wing of the vehicle and partly on the trunk lid of the vehicle. Obviously the invention is not limited to this concrete example. In such an example, the regulation provides it to be necessary for the fixed part of the light to emit a light flux of a first predetermined intensity when the trunk lid is open. In this provision, in principle only the fixed part is visible from a position situated at the rear of the vehicle. When the trunk lid is closed, this same first light intensity must be produced globally, together, by the fixed and mobile parts, mounted on the wing and on the trunk lid of the vehicle. It follows therefrom that it is permitted for the fixed part to emit a light flux of a second intensity, lower than the first intensity, when the trunk lid is closed. In effect, since the mobile part of the light is then visible, it can also contribute to the emission of the overall light flux of the rear light. In a particular case in point, a first light source, of which at least one mobile part is mounted on the trunk lid of the vehicle is capable of ensuring a first light function on its own when the trunk is closed. A second light source, of which at least a fixed part is mounted on the wing of the vehicle, is then intended to produce a second light function, different from the first function, when the trunk is closed. When the trunk is open, at least the mobile part of the first source is no longer visible from the rear of the vehicle, such that, according to the invention, the second source will contribute to the production of the first light function. In this way, in the closed and open states of the trunk lid, the light sources will together remain capable of producing in common a light flux conforming to the regulation. The device and the method according to the invention make it possible, among other things, to implement this case provided by the regulation. This notably allows for a more efficient and more economical management of the electrical energy necessary to the operation of the lights concerned.

Other features and advantages of the present invention will be better understood from the exemplary description and the drawings in which.

In the following description, similar reference numbers will be used to describe similar concepts through the different embodiments of the invention.

Thus, the numbers 100, 200, 300 describe, for example, a light device in three different embodiments conforming to the invention.

Unless specifically indicated to the contrary, technical features described in detail for a given embodiment can be combined with the technical features described in the context of other embodiments described by way of example in a nonlimiting manner.

Figure 1:
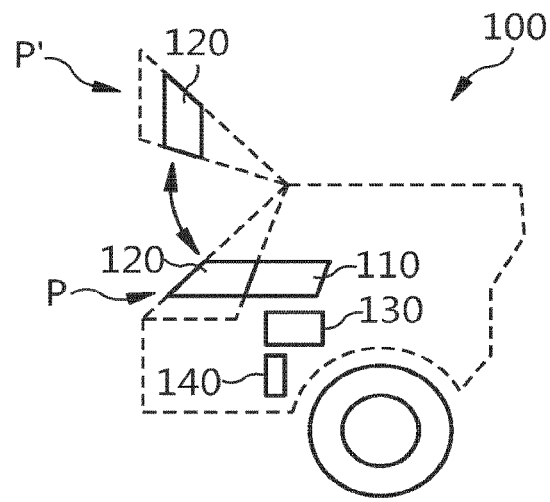
FIG. 1 is schematic illustration of a side view of the rear part of a motor vehicle equipped with a device according to a preferential embodiment of the invention.

FIG. 1 schematically illustrates the rear part of a motor vehicle, which comprises a light device, represented by the rear light, according to the invention. The invention will be illustrated using the light device 100 of which a first part 110 is arranged on a part of the fixed rear wing of the vehicle, while a second part 120 is arranged on a mobile part of the vehicle, such as, for example, the trunk lid of the vehicle. As illustrated, it follows therefrom that the second part 120 can assume at least two distinct positions P, P' relative to the first part 110, dependent on the closed or open state of the trunk lid. Obviously, the invention can find applications other than that described by way of example, when the technical constraints are identical to those described. Similarly, the device can consist of more than two parts, the mobile and fixed parts comprising, for example, respective pluralities of parts.

Each of the parts 110, 120 can be described generally by the term "a light source". A light source can be made of a plurality of elementary light sources, such as, for example, light-emitting diodes, LEDs, laser diodes or organic light-emitting diodes, OLEDs.

Components of a light device for a motor vehicle which have no direct impact on the operation of the invention are not described in detail in the context of the present invention.

Thus, it is known that such devices comprise optical means comprising, for example, optical lenses and/or light guides for guiding the light emitted by each of the elementary sources. Similarly, it is known practice to use means for driving the power supply of the elementary sources. Such means are used to convert a direct current of a first intensity, supplied generally by a current source internal to the vehicle such as a battery, into a load current of a second intensity, suitable for powering the elementary light sources. It is also known practice to provide several distinct current intensities according to the required intensity of the light emitted by the elementary light sources.

The device comprises means 130 capable of obtaining a signal indicative of the relative position of the first and second light sources, therefore of the fixed and mobile parts of the light device 100. By using this signal which indicates the relative position of the two parts of the light, means for controlling the light flux 140, which can for example be incorporated in the means for driving the power supply of the light sources, make it possible for the sources 110, 120 to emit light fluxes of different intensities according to their relative position. For example, when a first position P is indicated by the means 130, a current of a first intensity is used to power the LEDs of the source 110, whereas, when a second position P' is indicated by the means 130, a current of a second intensity is used to power the LEDs of the source 110.

Since the intensity of the light emitted by an LED depends on the intensity of the electrical current passing through it, light fluxes of different intensity are thus produced according to the position P, P' signaled.

Figure 2:
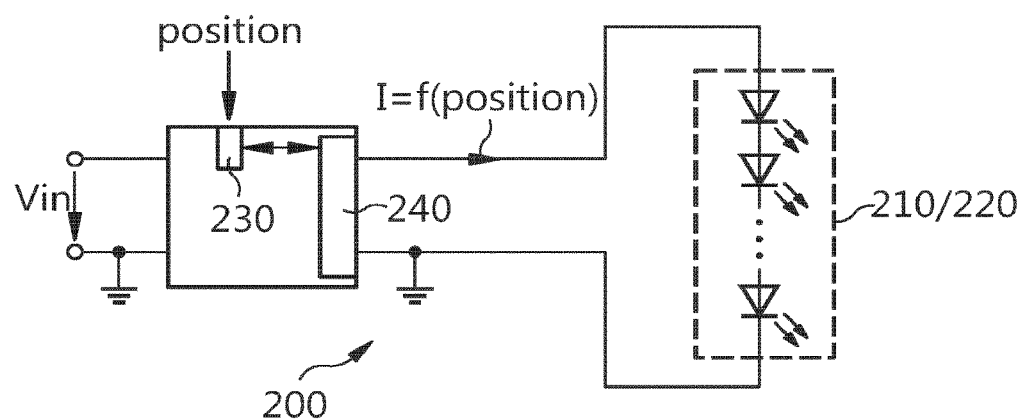
FIG. 2 is an illustration of a preferential embodiment of the device according to the invention.

FIG. 2 shows a preferential embodiment of the device 200 according to the invention. The light sources 210, 220 are shown equivalently. The means for controlling the light flux 240 obtain a signal indicating the relative position of the light sources 210, 220 and supply the sources with a power supply current of an intensity which is dependent on the position of the sources. In this embodiment, the obtaining means 230 are produced by reception means capable of reading messages which circulate over a communication network of the vehicle. Typically, the computer system of a motor vehicle has access to a plurality of parameters of the vehicle, including the state of opening or of closure of the doors. Thus, when the trunk lid is open/closed, a corresponding message can circulate over the communication bus of the vehicle, which can be a bus of "controller area network", CAN, type.

The obtaining means 230 form an interface relative to the communication bus, such that the information concerned can be used by the means for controlling the light flux 240. Alternatively, instead of reading the front lid open/closed information on the communication bus, the information read can also directly indicate a flux intensity which is to be emitted by each of the sources 210, 220. It is sufficient for the information obtained by the means 230 to indicate, directly or indirectly, the relative position of two light sources 220, 230. The specific information which circulates over the communication bus depends on the specific implementations of the onboard control systems of each vehicle.

Figure 3:
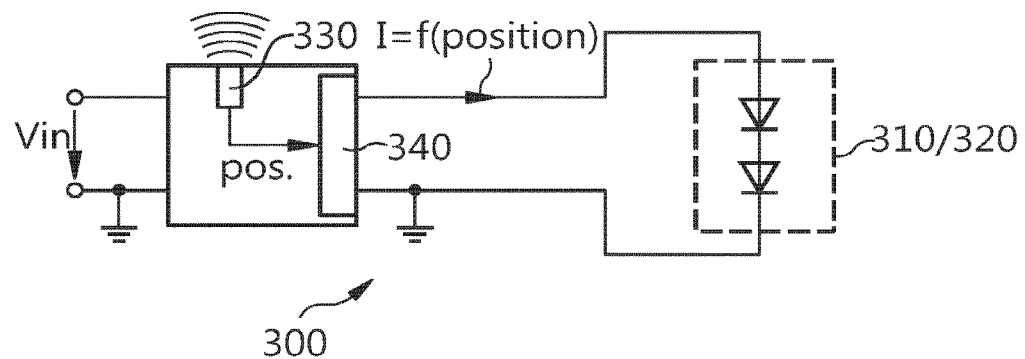
FIG. 3 is an illustration of a preferential embodiment of the device according to the invention.

FIG. 3 shows another preferential embodiment of the device 300 according to the invention. The light sources 310, 320 are shown equivalently. The means for controlling the light flux 340 obtain a signal indicating the relative position of the light sources 310, 320 and supply the sources with a power supply current of an intensity which is dependent on the relative position of the sources. In this embodiment, the obtaining means 330 are active means which make it possible to detect the position of at least the mobile source 320 relative to the fixed source 310. The obtaining means can for example comprise electronic components such as gyroscopes, accelerometers, or inclinometers. In a particularly preferred embodiment, such electronic components are installed on the printed circuit which bears the elementary sources of the second source 320. When the trunk lid of the vehicle is open, the position of the printed circuit changes. This change is detected by the electronic components concerned in a known manner. The detection signal is then relayed by wire or wirelessly to the means for controlling the light flux 340, which power the sources 320 and 310 according to the detection signal received.

Such an embodiment, comprising active obtaining means 330, presents the advantage of being independent of the computer and/or communication system of the motor vehicle that is equipped with it.

Once the signal indicating the relative position of the light sources is available, the flux management method can be carried out in different ways, for example by using dedicated electronic circuits or by programming a programmable microcontroller element. Such implementations are within the scope of those skilled in the art.

A preferred example of management is described referring to FIG. 1. When the trunk lid of the motor vehicle is closed, the means 130 detect the position P of the light source 120 relative to the source 110. In this position, the source 110 is intended to produce a first light function, and the second light source 120 is intended to produce a second light function, different from the first function. In an alternative embodiment not illustrated, the light sources 110, 120 can be respectively fixed and mobile parts of a set of two sets of larger light sources, intended to produce together the first and second light functions respectively.

It is assumed that the first light function requires the emission of a light flux of an intensity I-110 directed toward the rear of the vehicle, whereas the second light function requires the emission of a light flux of an intensity I-120. As a consequence of this detection, the control means 140 make in the example shown, the sources 110 and 120 each emit a light flux of a first intensity I-110, I-120, the first intensities conforming to the two light functions respectively.

The exemplary case assumes that the two functions are on at the same time. Obviously, if one of the two functions is not on, the source which is respectively intended to produce the function concerned emits no light flux, or a zero flux.

When the trunk lid of the motor vehicle is completely open, the means 130 detect the position P' of the light source 120 relative to the source 110. The light source 120 is no longer capable of emitting on its own the required light intensity I-120 toward the rear of the vehicle. As a consequence of this detection, the control means 140 make the first source 110 emit a second light intensity II-110, substantially equal to the light intensity I-120. Depending on the first light intensity level I-110, this can generate either an increase or a reduction of light intensity emitted by the source 110. In this position P', the first source therefore contributes to the production of the second light function. Generally, the control means make the first source fill the part of the light flux required by the second light function, which can no longer be produced by the mobile part 120 in the position F. In a particular embodiment, the light source 120 is off in the position P'. In this case, following the detection of the position P' by the means described, corresponding to the trunk open, the light source 110 is made to produce the function that the light source 120 produces in position P, corresponding to the trunk closed.

Preferably, the control means 140 at the same time make the second source 120 reduce the intensity of the light flux emitted relative to the first intensity to arrive at a second lower intensity, for example zero.

Advantageously, the obtaining means 130 and management means 140 are configured such that, for intermediate positions detected between the closed position P and the completely open position P' of the trunk lid, the intensities of the light fluxes emitted by the sources 110 and 120 are situated at intermediate levels between the extremes described.

In this way, when the trunk lid switches gradually from the closed state to the completely open state, the intensity of the light flux emitted by the first source 110 switches gradually from the first intensity level I-110 to an intensity level II-110. At the same time, the intensity of the light flux emitted by the second source 120 switches gradually from the first level I-120 to a zero intensity level. Similarly, when the trunk lid is closed again, the light sources 110 and 120 are once again gradually made to emit light fluxes corresponding to the two light functions in the production of which they participate.

The overall intensity emitted by the light sources 110 and 120 and preferably controlled, in all the relative positions assumed by the two sources, such that the device implements the constraints of a regulatory light function. A regulatory light function is notably understood to mean a light function for which the light intensity must lie between a lower predetermined regulatory light intensity and a higher predetermined regulatory light intensity.

The invention claimed is:

1. A light device for a motor vehicle, comprising:
    at least two light sources, of which at least one first light source is to be arranged on a first part of the chassis of the motor vehicle, and at least one second light source is to be arranged on a second part of the chassis, such that at least two distinct and predetermined relative positions (P, P') relative to one another are assumable by the first and the second light sources,
    wherein the device comprises a controller to control light flux from the light sources, configured to control emission of different light fluxes by the light sources, according to relative position of the first and of the second light sources, and
    wherein the controller is configured to control the two light sources according to the relative position of the first and of the second light sources such that, for at least one first predetermined relative position, the first light source emits a light flux of a first predetermined intensity to perform a first predetermined regulatory light function of the motor vehicle and the second light source emits a light flux of a second predetermined intensity to perform a second predetermined regulatory light function of the motor vehicle distinct from the first predetermined regulatory light function and such that, for at least one second predetermined relative position, the first light source emits a light flux of a third predetermined intensity to perform the second predetermined regulatory light function, the light flux of the third predetermined intensity being equal to the light flux of the second predetermined intensity.

2. The device according to claim 1, wherein the device comprises means to obtain a signal indicative of the relative position of the first and second light sources.

3. The device according to claim 1, wherein the controller is configured to control the first and second light sources such that these sources, when they are in the first predetermined relative position, together emit a first overall light flux to perform the first predetermined regulatory light function.

4. The device according to claim 1, wherein the first predetermined intensity is lower than the third predetermined intensity.

5. The device according to claim 1, wherein the controller is configured to control the second light source such that the second light source emits a light flux of a fourth predetermined intensity when the indicated relative position corresponds to the second predetermined relative position (P'), the second predetermined intensity being higher than the fourth predetermined intensity.

6. The device according to claim 1, wherein the controller is configured to control the second light source such that the second light source emits a light flux of a fourth predetermined intensity when the indicated relative position corresponds to the second predetermined relative position (P'), the second predetermined intensity being lower than the fourth predetermined intensity.

7. The device according to claim 1, wherein the controller is configured to control the first and second light sources such that the sum of the intensities of the light flux emitted by these light sources when the indicated relative position corresponds to the first predetermined relative position (P) is lower than or equal to a higher predetermined regulatory light intensity.

8. The device according to claim 7, wherein the controller is configured to control the first and second light sources such that the sum of the intensities of the light flux emitted by these light sources when the indicated relative position corresponds to the second predetermined relative position (P') is higher than or equal to a lower predetermined regulatory light intensity.

9. The device according to claim 8, wherein the controller is configured such that the lower predetermined regulatory light intensity of the first and of the second light sources is a minimum intensity, and wherein the higher predetermined regulatory light intensity of the first and second light sources is a maximum intensity.

10. The device according to claim 3, wherein the controller is configured such that the first and/or the second light source emits a flux of an intensity lying between the lower predetermined regulatory light intensity and the higher predetermined regulatory light intensity, when the indicated position is an intermediate position between the first predetermined relative position (P) and the second predetermined relative position (P').

11. The device according to claim 3, wherein one of the first light source and/or the second light source is mobile between the first and the second predetermined relative positions, the other being fixed, and wherein the controller is configured such that the mobile source emits a flux of an intensity which is a function of an intermediate position between the first predetermined relative position (P) and the second predetermined relative position (P').

12. A motor vehicle equipped with a light device, wherein the light device corresponds to the device according to claim 1.

13. The motor vehicle according to claim 12, wherein the first light source is arranged on a rear wing of the chassis, and wherein the second light source is arranged on a face of the trunk lid of the vehicle, which is mobile relative to the rear wing of the chassis.

14. The motor vehicle according to claim 13, wherein the first predetermined relative position corresponds to the closed position of the trunk lid, and wherein the second predetermined relative position corresponds to the open position of the trunk lid.

15. A method for managing the light flux in a light device for a motor vehicle, wherein the method comprises:
providing a light device comprising at least two light sources, of which at least one first light source is intended to be arranged on a first part of the chassis of the motor vehicle, and at least one second light source is intended to be arranged on a second part of the chassis, such that at least two distinct and predetermined relative positions relative to one another are assumable by the first and second light sources;
obtaining a signal indicative of a relative position of the first and second light sources utilizing means to obtain said signal;
controlling the two light sources such that, according to the relative position of the first and second light sources such that, for at least one first predetermined relative position, the first light source emits a light flux of a first predetermined intensity to perform a first predetermined regulatory light function of the motor vehicle and the second light source emits a light flux of a second predetermined intensity to perform a second predetermined regulatory light function of the motor vehicle distinct from the first predetermined regulatory light function and such that, for at least one second predetermined relative position, the first light source emits a light flux of a third predetermined intensity to perform the second predetermined regulatory light function, the light flux of the third predetermined intensity being equal to the light flux of the second predetermined intensity, the position being indicated by said signal; and
powering at least one of the light sources so as to emit different light fluxes according to the relative position of the first and second light sources, the position being indicated by said signal.

16. The device according to claim 2, wherein the controller is configured to control the first and second light sources such that these sources, when they are in the first predetermined relative position, together emit a first overall light flux to produce the first predetermined regulatory light function.

17. The device according to claim 3, wherein the first predetermined intensity is lower than the third predetermined intensity.

18. The device according to claim 4, wherein the controller is configured to control the second light source such that the second light source emits a light flux of the fourth predetermined intensity when the indicated relative position corresponds to the second predetermined relative position (P'), the second predetermined intensity being higher than the fourth predetermined intensity.

19. A light device for a motor vehicle, comprising:
at least two light sources, of which at least one first light source is to be arranged on a first part of the chassis of the motor vehicle, and at least one second light source is to be arranged on a second part of the chassis, such that at least two distinct and predetermined relative positions (P, P') relative to one another are assumable by the first and the second light sources; and
a controller to control light flux from the light sources, configured to control emission of different light fluxes by the light sources, according to relative position of the first and of the second light sources,
wherein the controller is configured to control the two light sources according to the relative position of the first and of the second light sources such that, for at least one first predetermined relative position, the first light source participates in a production of a first predetermined regulatory light function of the motor vehicle and the second light source participates in a production of a second predetermined regulatory light function of the motor vehicle distinct from the first predetermined regulatory light function and such that, for at least one second predetermined relative position, the first light source participates in the production of the second predetermined regulatory light function,
wherein the controller is configured to control the first light source such that the first light source emits a light flux of a first intensity when the indicated relative position corresponds to the first predetermined relative position (P), and a flux of a second intensity when the indicated relative position corresponds to the second predetermined relative position (P'), the first intensity being lower than the second intensity, and
wherein the controller is configured to control the second light source such that the second light source emits the light flux of the first intensity when the indicated relative position corresponds to the first predetermined relative position (P), and the flux of the second intensity when the indicated relative position corresponds to the second predetermined relative position (P'), the first intensity being lower than the second intensity.

20. The device according to claim 6, wherein the controller is configured to control the first and second light sources such that the sum of the intensities of the light flux emitted by these sources when the indicated relative position corresponds to the first predetermined relative position (P) is lower than or equal to a higher predetermined regulatory light intensity.

21. The device according to claim 9, wherein the minimum intensity is zero.

* * * * *